US011069169B2

(12) United States Patent
Huang

(10) Patent No.: US 11,069,169 B2
(45) Date of Patent: Jul. 20, 2021

(54) SYSTEM AND METHOD FOR REMOTELY CONTROLLING LOCKS ON DEPOSITORIES

(71) Applicant: Alex Jen Huang, Rancho Palos Verdes, CA (US)

(72) Inventor: Alex Jen Huang, Rancho Palos Verdes, CA (US)

(*) Notice: Subject to any disclaimer, the term of this patent is extended or adjusted under 35 U.S.C. 154(b) by 0 days.

(21) Appl. No.: 16/654,411

(22) Filed: Oct. 16, 2019

(65) Prior Publication Data
US 2021/0118252 A1    Apr. 22, 2021

(51) Int. Cl.
| | |
|---|---|
| *G07C 9/00* | (2020.01) |
| *H04L 9/32* | (2006.01) |
| *G06F 16/23* | (2019.01) |
| *H04L 29/06* | (2006.01) |
| *G07C 9/32* | (2020.01) |
| *E05B 47/00* | (2006.01) |
| *H04W 88/02* | (2009.01) |

(52) U.S. Cl.
CPC ........... *G07C 9/32* (2020.01); *G06F 16/2379* (2019.01); *G07C 9/00182* (2013.01); *G07C 9/00912* (2013.01); *H04L 9/3234* (2013.01); *H04L 63/0428* (2013.01); *E05B 47/0002* (2013.01); *G07C 2009/0023* (2013.01); *H04W 88/02* (2013.01)

(58) Field of Classification Search
CPC .. G07C 9/32; G07C 9/00182; G07C 9/00912; G07C 2009/0023; G06F 16/2379; H04L 9/3234; H04L 63/0428; E05B 47/0002; H04W 88/02

USPC ......................................................... 340/5.73
See application file for complete search history.

(56) References Cited

U.S. PATENT DOCUMENTS

| | | | |
|---|---|---|---|
| 6,612,489 B2 | 9/2003 | McCormick et al. | |
| 6,827,273 B2 | 12/2004 | Wilz, Sr. et al. | |
| 8,844,811 B1 | 9/2014 | Rogers et al. | |
| 9,508,239 B1* | 11/2016 | Harrison | ................ G08B 3/10 |
| 9,741,010 B1 | 8/2017 | Heinla | |
| 2001/0042024 A1* | 11/2001 | Rogers | ................ G06Q 10/08 |
| | | | 705/26.81 |
| 2001/0045449 A1 | 11/2001 | Shannon | |

(Continued)

FOREIGN PATENT DOCUMENTS

EP    2 835 078 A1    11/2015

*Primary Examiner* — Edwin C Holloway, III
(74) *Attorney, Agent, or Firm* — Maier & Maier, PLLC

(57) ABSTRACT

The present invention relates to a system and method for remotely controlling locks on depositories, primarily locks used for the purpose of securing things using a scanning device and at least one identification token. Each lock (215) is provided with a token (112) that contains identification information related to its depository system (221). A scanning device (111) is needed to decode (211) the token (112) and communicate its information to an online database (212) for authorization to access the depository (221). If the scanner (111) is authorized to access the depository (221), the online database (212) will communicate a command (213) to the lock (215) to open. This operation will need to be repeated each time the depository needs to be opened. In some embodiments, the scanning device (111) may be operatively connected to a power source that can transfer power as a means of powering depository (221).

19 Claims, 10 Drawing Sheets

(56) References Cited

U.S. PATENT DOCUMENTS

| | | | |
|---|---|---|---|
| 2002/0014953 A1* | 2/2002 | Stephens | G07C 9/00571 |
| | | | 340/5.61 |
| 2002/0147919 A1* | 10/2002 | Gentry | G07F 7/00 |
| | | | 726/2 |
| 2004/0215480 A1 | 10/2004 | Kadaba | |
| 2004/0243426 A1 | 12/2004 | Hashimoto | |
| 2004/0254802 A1 | 12/2004 | Miller et al. | |
| 2005/0247771 A1 | 11/2005 | Engel | |
| 2012/0280783 A1* | 11/2012 | Gerhardt | H04W 12/003 |
| | | | 340/5.6 |
| 2014/0002236 A1* | 1/2014 | Pineau | G06F 21/34 |
| | | | 340/5.6 |
| 2014/0093171 A1* | 4/2014 | Archuleta | G06K 5/00 |
| | | | 382/182 |
| 2014/0254896 A1 | 9/2014 | Zhou et al. | |
| 2015/0228133 A1* | 8/2015 | Capaldi-Tallon | G07C 9/28 |
| | | | 340/5.54 |
| 2015/0332531 A1 | 11/2015 | Davidsson et al. | |
| 2015/0341336 A1* | 11/2015 | Trell | H04L 67/125 |
| | | | 726/5 |
| 2016/0066733 A1 | 3/2016 | Gozar | |
| 2016/0307380 A1* | 10/2016 | Ho | G07C 9/00309 |
| 2017/0124510 A1* | 5/2017 | Caterino | G07C 9/00896 |
| 2017/0178434 A1 | 6/2017 | Firth et al. | |
| 2018/0061154 A1* | 3/2018 | Scalisi | G06K 9/00771 |
| 2018/0262891 A1* | 9/2018 | Wu | H04W 4/00 |

\* cited by examiner

SYSTEM AND METHOD FOR REMOTELY CONTROLLING LOCKS ON DEPOSITORIES

CROSS-REFERENCE TO RELATED APPLICATIONS

The present application claims the benefit of provisional patent application Ser. No. 62/746,533, filed Oct. 16, 2018, by the present inventor, which is incorporated by reference in its entirety.

TECHNICAL FIELD

The present invention generally relates to controlling locks, and more particularly to a system and method for remotely controlling the opening of locks on depositories using a scanning device and at least one identification token.

BACKGROUND

The following is a tabulation of some prior art that presently appears relevant:

| Patent Number/Kind Code | Issue Date | Patentee |
|---|---|---|
| U.S. Patents | | |
| 2001/0045449-A1 | Nov. 29, 2001 | Shannon |
| 6,612,489-B2 | Sep. 2, 2003 | McCormick et al. |
| 2004/0215480-A1 | Oct. 28, 2004 | Kadaba |
| 2004/0243426-A1 | Dec. 2, 2004 | Hashimoto |
| 6,827,273-B2 | Dec. 7, 2004 | Wilz, Sr. et al. |
| 2004/0254802-A1 | Dec. 16, 2004 | Miller et al. |
| 2005/0247771-A1 | Nov. 10, 2005 | Engel |
| 2014/0002236-A1 | Jan. 2, 2014 | Pineau et al. |
| 2014/0254896-A1 | Sep. 11, 2014 | Zhou et al. |
| 8,844,811-B1 | Sep. 30, 2014 | Rogers et al. |
| 2015/0332531-A1 | Nov. 19, 2015 | Davidsson et al. |
| 2016/0066733-A1 | Mar. 10, 2016 | Gozar |
| 2017/0178434-A1 | Jun. 22, 2017 | Firth et al. |
| 9,741,010-B1 | Aug. 22, 2017 | Heinla |
| Foreign Patents | | |
| EP 2 835 078-A1 | Nov. 2, 2015 | Ryan et al |

Online shopping is an essential part of modern-day life. Today's e-commerce doesn't only include books and clothing, but lunch, groceries, prescription drugs, as well as dry cleaning. Not to mention globalization has also brought the world's marketplace to consumers' fingertips everywhere. Whether through a website or an app, as more and more people order items online and companies strive to meet their demand for speed, flexibility and convenience, the delivery and receipt of mailed parcels has become a bigger problem. Issues with last-mile delivery continue to be a challenge including the recipient not being present to receive parcels at the time of delivery, parcels being damaged or stolen when left unattended on a doorstep, and delivery companies delivering parcels to the wrong address or location.

These inconveniences have become a costly dilemma for both the sender and the recipient. The sender is oftentimes required to pay for additional administrative costs for rescheduling a delivery and/or replacement for damaged or lost goods. In return, the recipient must then wait for these items to be redelivered with the same potential issues occurring again or he or she must travel to a different location to personally collect their parcel. These options defeat the purpose of a convenient and secure online shopping experience.

Companies have tried to overcome these obstacles by using temporary access codes to store and retrieve parcels, encouraging consumers to give couriers access to their private homes and spaces, or even turning to self-driving cars, robots, and flying drones to help parcels reach their final destination.

U.S. Pat. No. 6,612,489, issued on Sep. 2, 2003 for a "System for Secured Delivery of Packages or Other Items" discloses a system for delivering an ordered item to a location where no one is available to receive the item, including a key locked storage box provided at the location in addition to a key receptacle at the location having a lock "openable" with a settable code. The challenge with using McCormick et al.'s solution is the purchaser has to manually set the code into the key receptacle lock after each order has been placed. This leaves room for user error. It's also not clear from the disclosure how the key receptacle will be able to handle multiple deliveries in one day. In addition, there is no way for the receiver to know who accessed the box last if multiple deliveries are made by different couriers nor is there a way to confirm whether the storage box and/or key receptacle have been properly locked after the delivery has been made.

U.S. 2014/0002236, issued on Jan. 2, 2014 for a "Door Lock, System and Method for Remotely Controlled Access" allows authorized users to enter the front door of a residence or office when no one is available while U.S. Pat. No. 2015/0332531, issued on Nov. 19, 2015 for a "Methods and Systems for Enabling a Temporary User to Gain Temporary Access to a Locked Space of a Vehicle" allows authorized users to access to the trunk of a car. Both systems and methods fail to address the issue of privacy, potentially allowing third-party employees to intrude and identify the contents inside homes or exposing license plate numbers and other private information that is not necessarily needed to complete a delivery.

U.S. Pat. No. 9,741,010, issued on Aug. 22, 2017 for a "System and Method for Securely Delivering Packages to Different Delivery Recipients with a Single Vehicle" is one of many unmanned delivery systems now being explored. Each has its physical limitation. Heinla's solution in particular discloses a delivery system and method for delivering packages to multiple recipients using a mobile robot having a delivery package space suitable for accommodating at least two packages. In some embodiments, each package comprises at least one package ID and a scanner on the robot can be used to verify if the correct package has been removed from the package space. The discovery of the wrong package being delivered is not always immediate and can cause further inconvenience if it has to be recovered if picked up by the wrong recipient. There is also no method of verifying if the correct item was deposited in the first place. In addition, the solution does not address the instances when the receiver is not available or at the intended pickup location to remove the package from the mobile robot.

Although each inventive in their own way, nevertheless these less-than-satisfactory options remain inconvenient, inflexible, and can result in loss of privacy for the recipient.

In the applicant's experience, there is a need for a secure, low-powered, user-friendly system and method for remotely controlling locks on depositories to verify and record access of known users. One embodiment of this invention is used to ensure the safe delivery of mailed parcels and other items; however, this invention is not limited to just this use case, but should cover all other usages where a system and method for remotely controlling locks on depositories can be implemented.

SUMMARY

One or more embodiments of this invention overcome the limitations of the prior systems and methods described above and advantageously address the needs above as well as other needs by providing systems, methods, and apparatuses of remotely controlling locks on depositories. This section is provided to introduce a selection of concepts that are further described in depth in the Detailed Description section below. This summary is not intended to identify key features of the claimed subject matter, nor is it intended to be used as an aid in determining the scope of the claimed subject matter.

The present invention generally relates to a system and method for remotely controlling locks on depositories, primarily locks used for the purpose of securing things using a scanning device and at least one identification token. Each lock is provided with a token that contains identification information including, but not limited to, its depository and location. Parcels delivered to or sent from the depository will also have identification tokens assigned to them. A user, such as a courier, will need a scanning device to read and decode these tokens. Once decoded, the scanning device communicates the information from the scanning device and each scanned token to an online database for authorization to access the depository. If the user or scanner is authorized to access the depository, the online database will communicate a command to the lock to open. If the user or scanner is not authorized to access the depository, the online database will not communicate an "open" command to the lock and the depository will remain closed. This operation will need to be repeated each time the depository needs to be opened. The online database will keep a record of when each token is used and who used it to record attempts to access the depository as well as confirmed access and/or delivery. A traditional lock and key may also be used to access the depository, but it is not necessary.

In one embodiment of the invention, a power supply is provided, wherein a mobile device can be configured to transfer power to the microprocessor, lock, or other components associated with the depository system.

In other embodiments of the invention, a system and an apparatus for implementing the steps of the above-outlined method for remotely controlling locks on depositories are provided with various ways to power the system.

Advantages

Accordingly, several advantages of one or more aspects of the invention are as follows:

Since a scanning device and tokens are used for identification and verification purposes, there is no need for carrying ID cards or keeping track of access codes. These tokens will also ensure the correct parcel is being deposited in the correct depository at all times.

Each depository is also capable of being used by multiple users. The online database will keep a record of when each depository lock's token is used and who used it to record attempts to access the depository as well as confirmed access and/or delivery. This is advantageous, as it ensures that no unauthorized persons can get access to the depository or its contents. This information may be viewed anytime through a user interface giving the owner of the locked depository insight into who visited their depository and when.

Another advantage of the system and method of the present invention is privacy. A locked depository allows objects to be stored securely and out of view from others without the need of going inside their private homes and spaces. Since all data processing will be encrypted and done through an online database, any user accessing a depository need not know the true identity of the recipient or the contents of what is being deposited. The different parties may also communicate through the user interface using messages or notifications.

In some embodiments of the invention, the system is provided with various ways to power the system, including providing a power supply, wherein a mobile device can be configured to transfer power to the microprocessor, lock, or other components associated with the depository system. This type of powering is particularly advantageous as it allows for low-energy and on-demand usage.

Other advantages of one or more aspects will be apparent from a consideration of the ensuing description and drawings.

Additional aspects, objects, advantages, and novel features of the examples will be set forth, in part, in the Description sections that follow and will become apparent to those skilled in the art upon examination of the descriptions and the accompanying drawings or may be learned by production or operation of the examples. The objects and advantages of the concepts may be realized and attained by means of the methodologies, instrumentalities, and combinations particularly pointed out in the appended Claims section.

BRIEF DESCRIPTION OF THE DRAWINGS

Attention is now directed to drawings that illustrate the present invention. The above and other aspects, features, and advantages of several embodiments of the present disclosure will be more apparent from the following more particular description thereof, presented in conjunction with the following figures. Embodiments are illustrated by way of example and not limited by the figures of the accompanying drawings in which like references indicate similar elements and in which:

FIGS. 11a, 11b, 11c, and 11d show examples of embodiments with tokens positioned on or near the depository locks they are associated with.

Figure 1A:
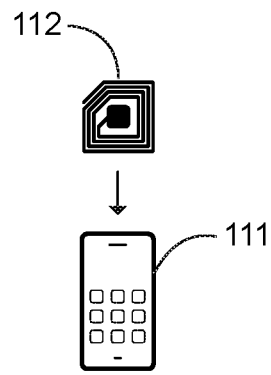
FIG. 1a shows a representation of one exemplary portable scanning device scanning one token, in accordance with some embodiments.

These drawings are presented to aid in understanding the present invention. Corresponding reference numbers indicate corresponding components throughout the several drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure. The scope of the present invention is not limited to what is shown in the figures.

DETAILED DESCRIPTION

The following detailed description of embodiments includes references to the accompanying drawings. References throughout this specification to "one embodiment," "an embodiment," "some embodiments," or similar language means that a particular feature, structure, or characteristic described in connection with an example implementation is included in at least one embodiment of the present disclosure. Thus, the appearances of the phrases "in one embodiment," "in an embodiment," "in some embodiments," and similar language throughout this specification may, but do not necessarily all refer to the same embodiment.

Furthermore, the described features, structures, or characteristics of embodiments may be combined in any suitable manner in one or more implementations. In the following description, numerous specific details are provided, such as examples of programming, software modules, user selections, network transactions, database queries, database structures, hardware modules, hardware circuits, hardware chips, and the like to provide a thorough understanding of embodiments. One skilled in the art will recognize that the embodiments can be practiced without one or more of the specific details, or with other methods, components, materials, and so forth. In other instances, well-known structures, materials, or operations are not shown or described in detail to avoid obscuring aspects of the disclosure.

Aspects of the embodiments will now be presented with reference to a system and method for remotely controlling locks on depositories. This system and method will be described in the following detailed description and illustrated in the accompanying drawings by various blocks, components, circuits, steps, operations, processes, algorithms, and the like. Collectively, they may be referred to as "elements". These elements may be implemented using electronic hardware, computer software, non-electric devices, or any combination thereof. Whether such elements are implemented as hardware or software depends upon the particular application and design constraints imposed on the overall system.

By way of example, an element, any portion of an element, or any combination of elements may be implemented with a processing system that includes one or more processors. Examples of processors include microprocessors, microcontrollers, integrated circuits, Central Processing Units (CPUs), Systems on a Chip (SoCs), Radio-Frequency Identification (RFID), Near-Field Communication (NFC), and other suitable hardware configured to perform various functions described throughout this disclosure. One or more processors in the processing system may execute software, firmware, hardware, or middleware collectively referred to as "software". The term "software" shall be construed broadly to mean instructions, instruction sets, code, code segments, program code, programs, subprograms, software components, applications, software applications, software packages, routines, subroutines, objects, executables, threads of execution, procedures, functions, and the like, whether referred to as hardware, firmware, operating systems, middleware, software, or otherwise.

Accordingly, in one or more exemplary embodiments, the functions described may be implemented in hardware, firmware, operating systems, middleware, software, or any combination thereof. The software and commands may be stored on or encoded as one or more instructions or code on a non-transitory machine-readable medium. Machine-readable media includes computer storage media. Storage media may be any available media that can be accessed by a computer. By way of example, and not limitation, such computer-readable media can comprise a Random-Access Memory (RAM), a Read-Only Memory (ROM), solid-state memory or any other data storage devices, combinations of the aforementioned types of computer-readable media, or any other medium that can be used to store computer code in the form of instructions or data structures that can be accessed by a microprocessor.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Although the diagrams and descriptions show a specific order of executing the process steps, the order of executing the steps may be changed relative to the order shown in certain embodiments without departing from the scope of the present disclosure. Also, two or more blocks shown in succession may be executed concurrently or with partial concurrence in some embodiments. Certain steps may also be omitted from the process-flow diagrams for the sake of brevity. In some embodiments, some or all of the steps shown in the process-flow diagrams can be combined into a single process.

Moreover, it shall be understood that when an element is referred to as being "on," "connected," or "coupled" to another element, it can be directly on, connected, or coupled to the other element or intervening elements can be present. Other words, including spatially relative terms may be used to describe an element or feature's relationship to another element and/or feature, such as illustrated in the drawings.

The present system and method for remotely controlling locks on depositories comprise one or more of the following components:

Lock

In some embodiments, the lock is an electromagnetic lock; however, any lock that can be electronically controlled to be remotely unlocked and locked is within the scope of the present invention.

Depository

The term "depository" or "depository system" shall be construed to mean any depository, container, receptacle, postbox, locker, cabinet, vault, safe, vial, and the like, as well as any or all of its associated elements. Thus, depository locks and depository computers are considered part of a depository system. The depository is also defined by sidewalls that form a cavity sized and dimensioned to contain objects and comprises a cover, cap, lid, or door that regulates access to said cavity. In some instances, a "depository" can also be construed to mean an intended destination, user, or recipient. Each depository can be identified with at least one token.

Scanning Device

The term "scanning device" or "scanner" shall be construed to mean any portable or non-portable electronic device having data processing capabilities, including a mobile device, mobile phone, barcode scanner, RFID scanner, smartphone, tablet computer, laptop computer, desktop computer, computer workstation, server, network device, network appliance, radar, and the like. Furthermore, the scanning device and any attached devices should be capable of communicating, decoding, and/or receiving data from any machine-readable medium and able to access the internet. Input of data to the scanning device should not be limited to NFC, RFID, barcodes, QR codes, camera, radar, or electromagnetic energy, and the like. The manual input of token identification information can be possible through a user interface.

In some embodiments, the scanning device may be operatively connected to a power source and can transfer power to another device through electrical contacts or wirelessly through the use of an antenna.

Token

The term "token" shall be construed to mean any machine-readable medium that may be used to identify something assigned to it. Therefore, some things identified with tokens may include, but are not limited to: objects, postage, letters, parcels, depositories, bottles, vials, locks, safes, vaults, scanners, addresses, locations, phone numbers, email addresses, social media accounts, users, and recipients. Examples of machine-readable medium may include, but are not limited to: data carriers; magnetic media such as magnetic disks; cards, tapes, and drums; punched cards and paper tapes; optical discs; magnetic ink characters; barcodes; QR codes; NFC chips; and RFID tags.

Credentials

According to some embodiments of this disclosure, a user can remotely control locks on a depository using a scanning device and at least one token. For example, when the scanner scans a token, the scanner's identification information is communicated to a remote data processing unit where the information can be processed to determine if the user has the appropriate credentials or permission level to access the depository associated with the token at that time. Information such as a user ID, address, phone number, email address, social media account, token data, and the like are some forms of the user's credentials and can be accessed through the user interface or software on the scanning device.

By scanning the token, the scanning device can also be supplied with an ID, address, or tracking number of an object it has been assigned to, such as a mailbox or a parcel. This information is also communicated to the remote data processing unit and will help determine if the correct depository lock has been identified by the user using the scanning device. In some embodiments, the information is encrypted by the scanning device prior to communicating with the remote data processing unit, and is decrypted by the remote data processing unit for processing. Sometimes, more than one token is needed to gain access to the depository. The remote data processing unit may also request or obtain other information relevant to the verification process.

If the remote data processing unit or online database determines that the scanning device is authorized to access the depository, a signal will be communicated to the corresponding depository computer, located in or within close proximity to the depository, to open or release the lock. In some embodiments, the information is encrypted by the remote data processing unit prior to communicating with the depository computer, and is decrypted by the depository computer for processing.

Remote Data Processing Unit

The term "remote data processing unit" shall be construed to mean at least one of the following: server, service, online database, cloud database, cloud computing, blockchain, peer-to-peer network, and any database or processing system accessible from a local network or the internet. A cloud database is a database that is run on and accessed via the internet. Cloud computing is a computer platform that a cloud database runs on. The terminology used to describe a remote data processing unit is not meant to be limiting. Similar terminology and derivative implementations should be evident for those skilled in the art. Any computer connected to the internet is within the scope of the present invention if used for the purpose described herein. The online database can store and verify all transactions for scanning devices, tokens, and depository locks. The remote data processing unit may communicate with one or more devices simultaneously.

Depository Computer

In some embodiments, the depository computer is a microcontroller; however, any processor is within the scope of the present invention including a remote processor accessed over a network by any connection technique, including hardwire, USB, modem or other serial port, RFID, NFC, WIFI, cellular signal, Global Positioning System (GPS), radio, radar, General Purpose Input/Output (GPIO) link, or any other connection. Typically, communication between the scanning device and the depository computer is operatively connected through an online database.

The depository system can be low-powered.

When the processor receives an "open" command from the online database, the processor will typically do the following: 1) Communicate a command to the locking mechanism to cause it to unlock. Communication between the processor and the lock will be operatively connected. 2) Wait a predetermined amount of time before re-engaging the lock.

Encryption

In certain embodiments, prior to being transferred between the scanning device and the remote data processing unit, data can be encrypted using any suitable encryption method, such as a symmetric-key scheme or public-encryption scheme. After the data is transferred between the scanning device and the remote data processing unit, the encrypted data can be decrypted or otherwise processed.

Also, in certain embodiments, prior to being transferred between the remote data processing unit and the depository computer, data can be encrypted using any suitable encryption method, such as a symmetric-key scheme or public-encryption scheme. After the data is transferred between the remote data processing unit and the depository computer, the encrypted data can be decrypted or otherwise processed.

Wireless Power

According to various embodiments of this disclosure, it can be beneficial in many instances to allow scanning devices to wirelessly transmit and/or share power to tokens, computers, depository systems, and associated elements such as microprocessors, transceivers, memory, locks, sensors, and the like. For example, some embodiments allow one token and associated lock component to obtain power from and/or use battery power from a scanning device.

In a wireless power transmission system, a transceiver or power output device, driven by electric power from a power source, generates electromagnetic radiation, field and/or wave frequency signals, which transmit power across space to a receiver device containing one or more transceivers and antennas, which then converts it to electricity and supplies it to an electrical load. The wireless power can be provided simultaneously to other processes, like data transfer when required, but is not necessary.

First Embodiment

Figure 3:
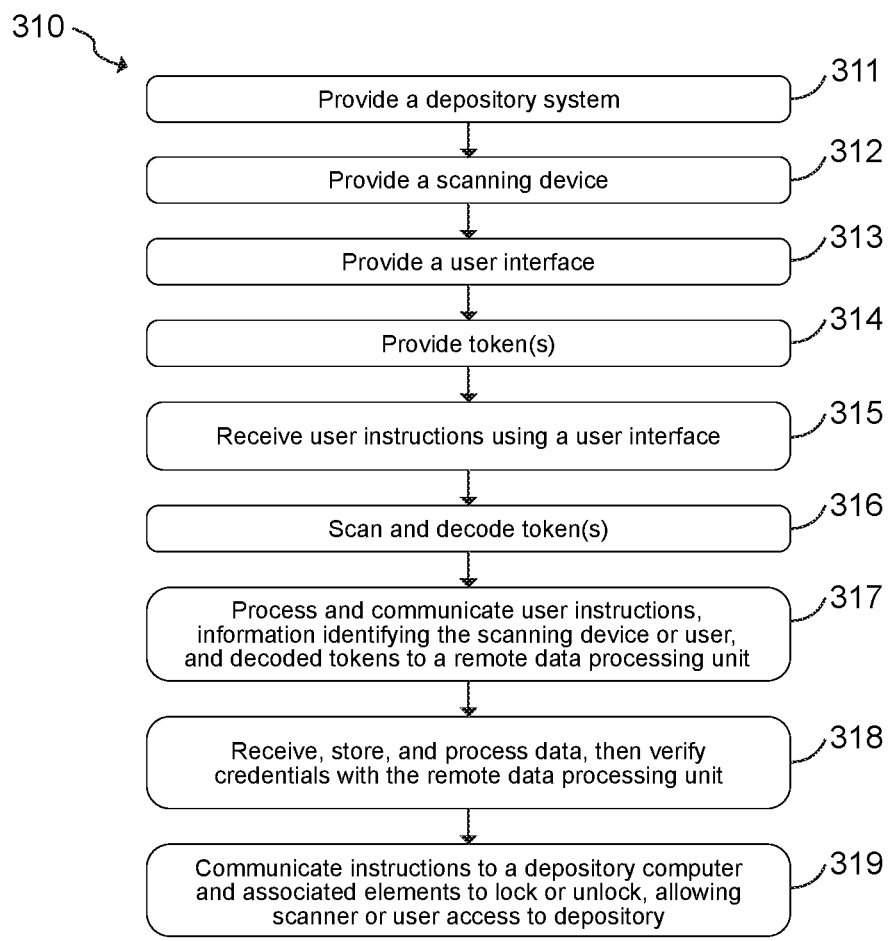
FIG. 3 depicts a simplified flow diagram of an exemplary method or process of remotely unlocking locks on depositories, in accordance with some embodiments.

FIG. 3 depicts a simplified flow diagram of an exemplary method 310 of remotely controlling locks on depositories.

Method 310 may be performed by processing logic that may comprise hardware, software, middleware, firmware, or any combination thereof. The processing logic refers to a scanning device, a remote data processing unit, a depository computer, a computing device, or a server.

Method 310 begins at step 311 when a depository system is provided. The provided depository system can be any depository, container, receptacle, postbox, locker, cabinet, vault, safe, and the like, as well as any or all of its associated elements. It is also defined by sidewalls that form a cavity sized and dimensioned to contain objects and comprises a cover or door that regulates access to said cavity.

At step 312, a scanning device is provided. The provided scanning device can be any portable or non-portable electronic device having data processing capabilities, including a mobile device, mobile phone, barcode scanner, RFID scanner, smartphone, tablet computer, laptop computer, desktop computer, computer workstation, server, network device, network appliance, radar, and the like. Said scanning device can have scanner identification and/or user information. Information such as a user ID, address, phone number, email address, social media account, token data, and the like are some forms of the user's credentials and can be accessed through the user interface or software on the scanning device.

At step 313, a user interface is provided. The provided user interface can be provided by a device owner, a third-party client or its agents, a scanning device, or a server. The user interface is configured to allow at least one of the following: the scanning of tokens and machine-readable media, the input of data, the login of a user profile, and the display of depository or token information. The user interface is further configured to communicate and receive information from a remote data processing unit.

At step 314, at least one token is provided. A token shall be construed to mean any machine-readable medium that may be used to identify something assigned to it. Some things identified with tokens may include, but are not limited to: objects, parcels, depositories, bottles, vials, locks, safes, vaults, scanners, addresses, locations, phone numbers, email addresses, social media accounts, users, and recipients. Examples of machine-readable medium may include, but are not limited to: barcodes, QR codes, NFC chips, and RFID tags. A token identifying a depository system and/or any component or group of components within that system should be at least one of the tokens identified.

At step 315, the scanning device receives user instructions through the user interface. The user instructions correspond to how the user wishes to access the depository. In some embodiments, the user instructions can include log-in credentials, device ID, location, and the like.

At step 316, scanned tokens are decoded. The decoding of tokens shall be construed to mean the extraction of data from a machine-readable medium, such as retrieving information stored in a QR code or RFID chip. Decoded data may include instructions or other identifying information.

At step 317, the scanning device will communicate, over the internet, user instructions, information identifying the scanning device or user, and decoded tokens to a remote data processing unit.

At step 318, the remote data processing unit will receive, store, and process all incoming data and verify the credentials with an online database. The remote data processing unit shall be construed to mean at least one of the following: server, service, online database, cloud database, cloud computing, blockchain, peer-to-peer network, and any processing system accessible from a local network or the internet. In one embodiment, the online database has a permission level assigned to the scanning device. Processing of incoming data on the remote data processing unit may change the permission level of the scanning device.

At step 319, the depository computer receives a command from the remote data processing unit. The depository computer is operatively connected to the depository lock. The remote data processing unit will communicate instructions to the depository computer associated with the depository token as follows: If the scanning device's permission level is at or above a predetermined level, a command will be transmitted from the remote data processing unit to the depository computer to disengage the depository lock. If the command is to unlock, the depository computer will communicate a signal to unlock the depository lock. The depository lock should unlock, giving the user of the scanning device access to the depository. If the scanning device's permission level is below a predetermined level, a command will be transmitted from the remote data processing unit to the depository computer to keep the depository lock locked. In some embodiments, a message will be communicated to the scanning device notifying it of denied access.

The steps of method 310 may be implemented in an order different than described and shown in the figure. Moreover, method 310 may have additional steps not shown herein, but which can be evident for those skilled in the art from the present disclosure. Method 310 may also have fewer steps than outlined and shown in FIG. 3.

Using this exemplary process, if a consignee is expecting a delivery, the remote data processing unit or online database will first be notified of the parcel's tracking number, destination, and estimated delivery time by the consignor or courier. When the courier arrives at the depository with the parcel, he or she will use their scanning device to scan the tokens on the depository and parcel(s). The scanning device will communicate decoded token information to the remote data processing unit. The remote data processing unit will then determine whether the scanning device is authorized to access the depository. If access is granted, a command will be communicated to the lock to unlock.

Figure 4:
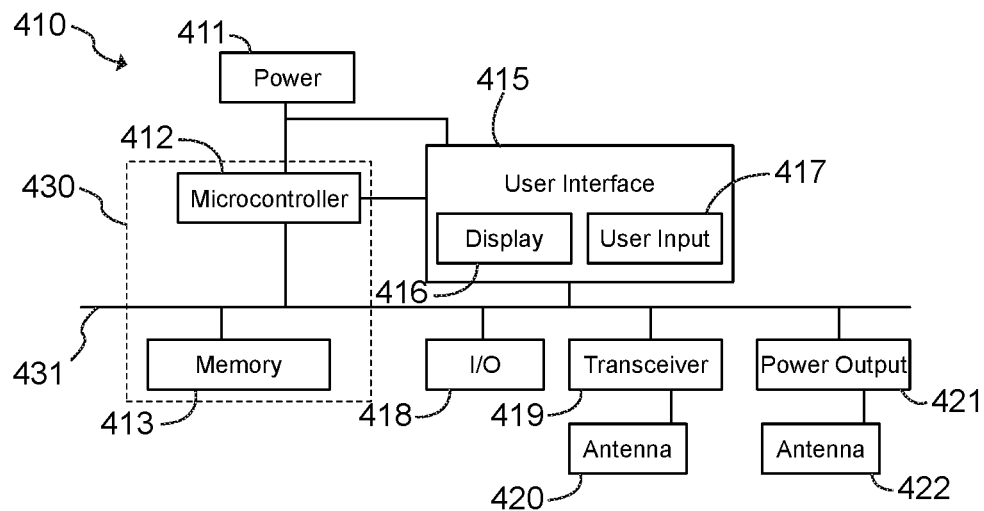
FIG. 4 illustrates an exemplary scanning device system for use in implementing systems, methods, techniques, devices, apparatuses, servers, microprocessors, tokens, sources, and the like, in accordance with some embodiments.

The systems, methods, techniques, devices, servers, sources, services, and the like described herein may be utilized, implemented, and/or run on many different types of devices and/or systems. FIG. 4 illustrates an exemplary scanning device system 410 that may be used for implementing systems, methods, techniques, devices, apparatuses, servers, microprocessors, tokens, sources, and the like, in accordance with some embodiments. One or more elements of system 410 may be used for implementing any system, apparatus, or device mentioned above or below, or parts of such systems, apparatuses, or devices, such as for example any of the above or below mentioned scanning devices (See 111, 111a, 111b, and 111c), user interface, functional circuitry, wireless power distribution circuitry, and the like. However, the use of system 410 or any portion thereof is certainly not required.

By way of example, system 410 may comprise a microcontroller or processor module 412, memory 413, and one or more communication links, paths, buses, or the like 431. Some embodiments include a user interface 415. A power source or supply 411 may be included or coupled with system 410.

System 410 comprises an example of a control and/or processor-based system with microcontroller 412. Microcontroller 412 can be implemented through one or more processors, microprocessors, CPUs, logic, local digital storage, firmware, other control hardware, or software, and may be used to execute or assist in executing the steps of the methods and techniques described herein, and control various communications, programs, content, listings, services, interfaces, and the like. Further, in some embodiments, microcontroller 412 can be part of a control system 430 and/or implemented through one or more processors with access to one or more memory 413. In some embodiments, microcontroller 412 may provide multiprocessor functionality. User interface 415 can allow a user to interact with system 410 and receive information through the system. In some instances, user interface 415 includes a display 416 and/or one or more user inputs 417. Accessory devices, such as a keyboard, a mouse, a camera, a touchscreen, radar, radio, photocells, remote control, buttons, and the like can be part of, wired, or wirelessly connected with system 410.

Memory 413, which can be accessed by microcontroller 412, typically includes one or more processor-readable media accessed by at least microcontroller 412, and can include, but is not limited to, RAM, ROM, solid-state memory, or any other data storage devices, combinations of the aforementioned types of computer-readable media, or any other medium that can be used to store computer code in the form of instructions or data structures that can be accessed by a microprocessor. Memory 413 can store code, software, executables, communication parameters, location, identifiers, scripts, data, content, time, user interface, programs, log or history data, user information, and the like.

In some embodiments, system 410 further includes one or more communication interfaces, ports, transceivers 419, and the like, allowing system 410 to communicate over a communication bus, a distributed network, a local network, the internet, communication link, other networks, or communication channels with other devices, and/or other such communications or combinations thereof. Further, transceiver 419 can be configured for wired, wireless, optical, fiber optical cable, radar, radio, or other such coupling configurations or combinations of such communications. System 410 further includes one or more antennas 420, and one or more power transfer antennas 422. One or more inputs and/or outputs (I/O) 418 may be provided, such as power and/or communication ports, USB ports, sensors, and the like. Furthermore, in some embodiments, system 410 further includes one or more standards for power output 421 and can be configured for wireless power transfer using one or more power transfer antennas 422.

One or more of the embodiments, methods, approaches, and/or techniques described above or below may be implemented in one or more computer programs executable by a processor. By way of example, such a system may comprise system 410, a smartphone, a scanner, an NFC reader, a camera, a tablet, a computer, server, and the like. Such a computer program or code may be used for executing various steps and/or features of the above or below described methods and/or techniques. That is, the computer program or code may be adapted to cause or configure a microprocessor to execute and achieve the functions described above or below. In some embodiments, the computer program may be stored or embodied on computer-readable storage or recording medium or media, such as any of the computer-readable storage or recording medium or media described herein.

Figure 5:
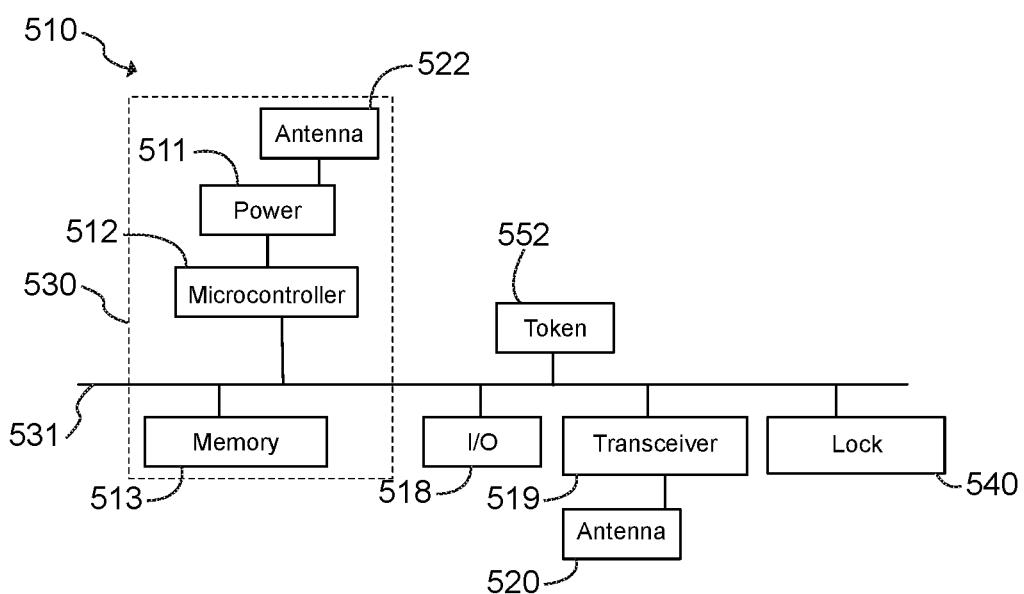
FIG. 5 illustrates an exemplary depository system for use in implementing systems, methods, techniques, devices, apparatuses, servers, microprocessors, tokens, locks, sources, and the like, in accordance with some embodiments.

Referring to FIG. 5, there is illustrated an exemplary depository system 510 that may be used for implementing systems, methods, techniques, devices, apparatuses, servers, services, microprocessors, tokens, sources, and the like, in accordance with some embodiments. One or more components of system 510 may be used for implementing any system, apparatus, or device mentioned above or below, or parts of such systems, apparatuses, or devices, such as for example any of the above or below mentioned depository systems (See 221, 912a, 912b, 912c), user interface, functional circuitry, wireless power distribution circuitry, and the like. However, the use of system 510 or any portion thereof is certainly not required.

By way of example, system 510 may comprise a microcontroller or processor module 512, memory 513, and one or more communication links, paths, buses or the like 531. Some embodiments may include a user interface, but it is not necessary. A power source 511 may be included or coupled with a control system 530. This embodiment is one where the power is wirelessly transferred using an antenna 522 from another device, such as a scanning device; however, any power source may be used. This way of powering system 510 is meant to be transitory. When the wireless power source is removed from antenna 522, system 510 will use all remaining power already transferred and eventually shut off. In some embodiments, a battery may be used in the system. In other embodiments, power is provided by means of electrical coupling or other wireless power transfer sources.

System 510 comprises an example of a control and/or processor-based system with microcontroller 512. Microcontroller 512 can be implemented through one or more processors, microprocessors, CPUs, logic, local digital storage, firmware, other control hardware, and software and may be used to execute or assist in executing the steps of the methods and techniques described herein, and control various communications, programs, content, listings, services, interfaces, and the like. Further, in some embodiments, microcontroller 512 can be part of control system 530 and/or implemented through one or more processors with access to one or more memory 513. In some implementations, microcontroller 512 may provide multiprocessor functionality. Accessory devices, such as a keyboard, a mouse, cameras, a touchscreen, remote control, buttons, and the like can be part of, wired, or wirelessly connected with system 510.

Memory 513, which can be accessed by microcontroller 512, typically includes one or more processor-readable media accessed by at least microcontroller 512, and can include, but is not limited to, RAM, ROM, solid-state memory, or any other data storage devices, combinations of the aforementioned types of computer-readable media, or any other medium that can be used to store computer code in the form of instructions or data structures that can be accessed by a microprocessor. Memory 513 can store code, software, executables, communication parameters, location, identifiers, scripts, data, content, time, user interface, programs, log or history data, user information, and the like.

In some embodiments, system 510 further includes one or more communication interfaces, ports, transceivers 519, and the like, allowing system 510 to communicate over a communication bus, a distributed network, a local network, the internet, communication link 531, other networks or communication channels with other devices, and/or other such communications or combinations thereof. Further, transceiver 519 can be configured for wired, wireless, optical, fiber optical cable, or other such coupling configurations or combinations of such communications. System 510 further includes one or more antennas 520, and typically one or more communications antennas and one or more power transfer antennas 522. One or more inputs and/or outputs (I/O) 518 may be provided, such as power and/or communication ports, USB ports, sensors, and the like. Furthermore, in some embodiments, system 510 further includes one or more sources for power 511, and can be configured for wireless power transfer using one or more power transfer antennas 522.

One or more of the embodiments, methods, approaches, and/or techniques described above or below may be implemented in one or more computer programs executable by a processor. By way of example, such a system may comprise system 510, a smartphone, a micro-computer, a microcontroller, a tablet, a computer, and the like. Such a computer program or code may be used for executing various steps and/or features of the above or below described methods and/or techniques. That is, the computer program or code may be adapted to cause or configure a microprocessor to execute and achieve the functions described above or below. In some embodiments, the computer program may be stored or embodied on a computer-readable storage or recording medium or media, such as any of the computer-readable storage or recording medium or media described herein.

In some embodiments, a depository token 552 may be operatively connected to control system 530. For example, token 552 may be an NFC or RFID device, where at least data or power is communicated through control system 530.

Similar to lock 215 in other figures, a lock 540 is included in system 510. In some embodiments, the lock is an electromechanical lock; however, any lock that can be electronically or remotely controlled to lock or unlock is within the scope of the present invention. An electromechanical lock shall be construed to mean an electromagnetic lock, magnetic lock, or any locking device that consists of at least an electromagnet and a locking mechanism. In some embodiments, the lock operates by means of a remote electric signal such as that generated by a microprocessor. The lock disengages, which makes it possible to open the depository. In some embodiments, the electromagnetic lock may use a solenoid, whereas a solenoid is a coil of wire used as an electromagnet. Lock 540 may be operatively connected to microcontroller 512.

Once system 510 is powered on, it will autonomously connect online and access the remote data processing unit to await further commands According to various embodiments of this disclosure, it can be beneficial in some instances to allow scanning devices to wirelessly transmit and/or share power to tokens, depository systems, microprocessors, and associated elements such as microprocessors, transceivers, memory, locks, sensors, and the like. For example, some embodiments allow one token and associated lock components to obtain power from and/or use battery power from a scanning device. In some implementations, an antenna system allows one or more of the following: scanning device, depository systems, and tokens to operate without any externally accessible communication ports and/or power cords. Instead, power and communications are received and/or transmitted wirelessly. For example, system 510 may receive power for its operations from an external power source. Furthermore, by way of example, if token 552 is an RFID tag, the scanning device can deliver power to the RFID tag to extract token information, while simultaneously delivering the needed power to operate at least depository computer 512 and/or depository lock 540. Whereas if the token does not require power, it should mean the power is delivered to operate other parts of the system. As such, in some implementations, the depository system can be designed and assembled without any external ports or connectors, and one or more antenna systems can be incorporated to allow the depository system to acquire power and perform its functions.

Figure 6:
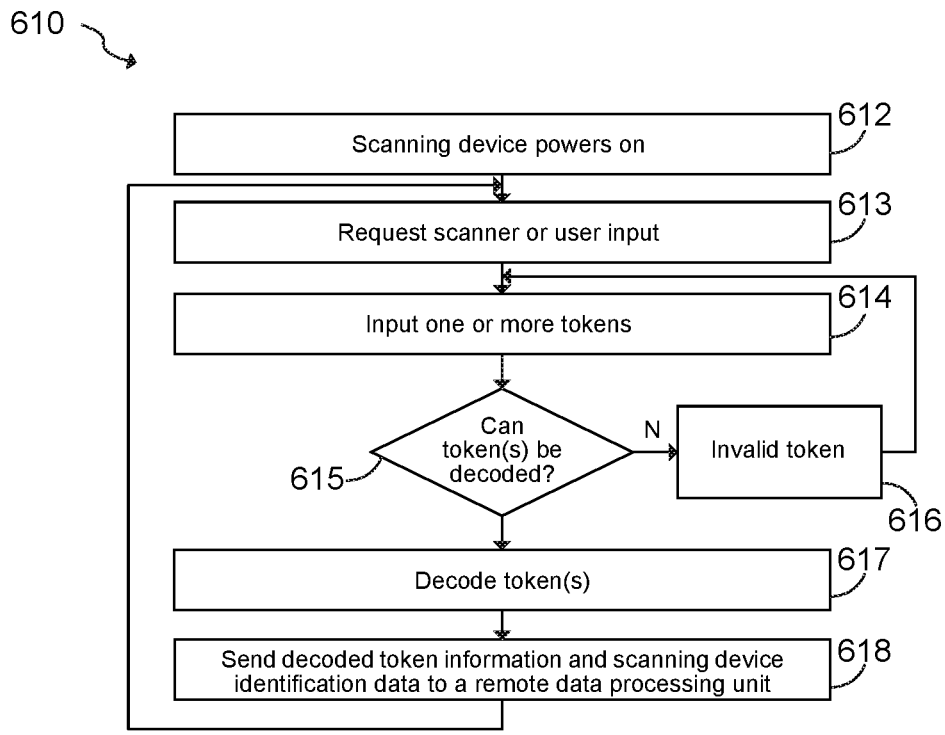
FIG. 6 depicts a simplified flow diagram of an exemplary method or process of inputting one or more tokens using a scanning device, in accordance with some embodiments.

FIG. 6 depicts a simplified flow diagram of an exemplary process 610 of inputting one or more tokens, and the like, using a scanning device in accordance with some embodiments. Process 610 may be performed by processing logic that may comprise hardware, software, or a combination of both. In one example embodiment, the processing logic refers to at least one of the following: a system, a microcontroller, a processor, a processor of a scanning device, a control system, a computing device, or a server. Notably, the steps of process 610 may be implemented in an order different than described and shown in the figure. Moreover, process 610 may have additional steps not shown herein, but which can be evident for those skilled in the art from the present disclosure. Process 610 may also have fewer steps than outlined below and shown in FIG. 6.

Process 610 begins at step 612 when a scanning device is powered on and at least one token is provided. In some embodiments, a user interface is presented.

At step 613, the scanner requests input for how the user wishes to proceed. Examples include retrieving an object from the depository, scanning tokens, or depositing an object into the depository.

At step 614, the scanning device accepts the input of one or more tokens. In some embodiments, this information is known and stored locally, while in other embodiments, the scanning device obtains this information as input from the user in the form of a barcode, RFID tag, identification information, a QR code, machine-readable media, and/or the like.

At step 615, each token inputted into the scanning device is checked to see if it can be decoded. If a token cannot be decoded or the information retrieved is invalid, the scanning device will display an error message and request the user to input a token again as seen in step 616.

At step 617, each token inputted into the scanning device is decoded to reveal identifying information.

At step 618, it is determined whether one or more tokens have been decoded. In those instances, all decoded token information and scanning device identification data are communicated to a remote data processing unit.

Figure 7:
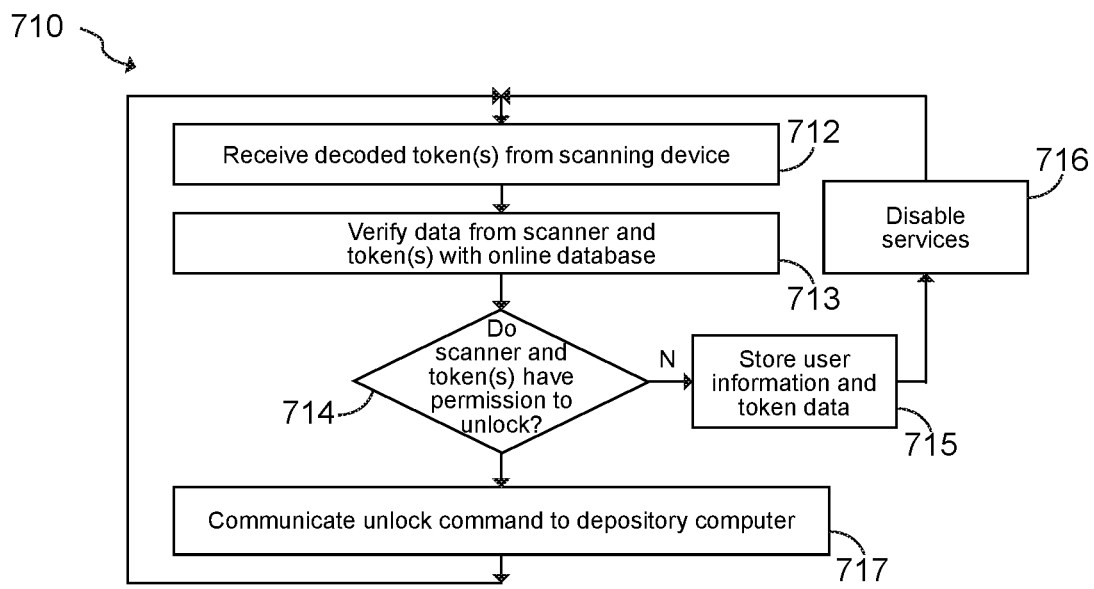
FIG. 7 depicts a simplified flow diagram of an exemplary method or process of authenticating one or more tokens using a remote data processing unit, in accordance with some embodiments.

FIG. 7 depicts a simplified flow diagram of an exemplary process 710 of authenticating one or more tokens, in accordance with some embodiments. Process 710 may be performed by processing logic that may comprise hardware (e.g., decision-making logic, dedicated logic, programmable logic, ASIC, and microcode), software (e.g., software run on a general-purpose computer system or a dedicated machine), or a combination of both. In one example embodiment, the processing logic refers to at least one of the following: a remote data processing unit, a controller, a processor, a computing device, or a server. Notably, the steps of process 710 may be implemented in an order different than described and shown in the figure. Moreover, process 710 may have additional steps not shown herein, but which can be evident for those skilled in the art from the present disclosure. Process 710 may also have fewer steps than outlined below and shown in FIG. 7.

Process 710 begins at step 712 when a remote data processing unit, online server, online database, or the like is presented and receives decoded token information from the scanning device.

The remote data processing unit receives at least one of the following: identifying information from the scanning device and at least one decoded token. The scanner's identification information is added to the online database. Information such as address, phone number, email address, social media account, profile, serial number, tracking number, token data, and the like are some forms of a user's credentials and can be retrieved through the user interface, operating system, or software.

At step 713, the server will verify data from the scanning device and token(s) with an online database.

At step 714, it is determined whether the scanning device and scanned token(s) have the credentials or permission level to unlock the depository lock. In those instances where the token(s) do not have permission to unlock, the process proceeds to step 715, where all user information and token data are stored and the process terminates at step 716. In those instances where the online database determines that the scanning device and token(s) are authorized to access the depository, a signal will be communicated to the corresponding depository computer, located in or within close proximity to the depository, to open or release the lock shown in step 717. In some embodiments, online database information is known and stored online, while in other embodiments, the online database information is unknown and gathered from a scanning device and/or other sources. In still other embodiments, the online database may issue a notification to a scanning device and/or other user interface.

Figure 8:
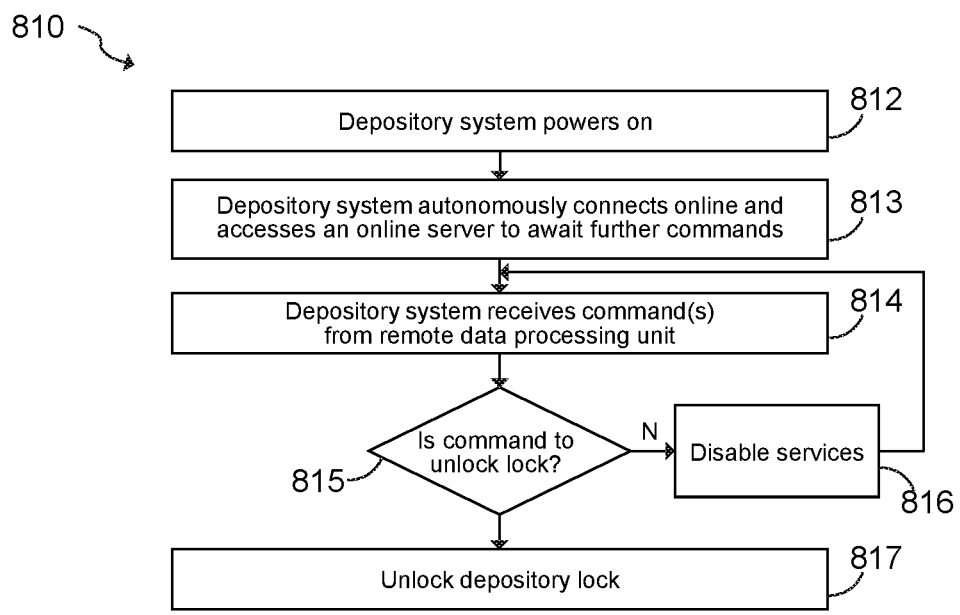
FIG. 8 depicts a simplified flow diagram of an exemplary method or process of a depository computer receiving one or more commands to lock or unlock a depository lock, in accordance with some embodiments.

FIG. 8 depicts a simplified flow diagram of an exemplary process 810 of a depository computer receiving one or more commands to lock or unlock a depository lock, in accordance with some embodiments. Process 810 may be performed by processing logic that may comprise hardware (e.g., decision-making logic, dedicated logic, programmable logic, ASIC, and microcode), software (e.g., software run on a general-purpose computer system or a dedicated machine), or a combination of both. In one example embodiment, the processing logic refers to at least one of the following: a system, a depository computer, a depository control system, a processor, a computing device, or a server. Notably, the steps of process 810 may be implemented in an order different than described and shown in the figure. Moreover, process 810 may have additional steps not shown herein, but which can be evident for those skilled in the art from the present disclosure. Process 810 may also have fewer steps than outlined below and shown in FIG. 8.

Process 810 begins at step 812 when a depository system is powered on. In some embodiments, the power is transmitted using at least one antenna to provide power to tokens, a depository system, and associated elements. For example, a power source can wirelessly transmit and/or share power to the depository system, depository computer, depository lock, and other associated elements.

At step 813, the depository computer will autonomously connect online and access an online server to await further commands. Furthermore, the depository computer is operatively connected to a remote data processing unit, online server, or online database. In some embodiments, the depository computer may access the online server over a network by any connection technique, including hardwire, wireless, USB, cellular network, modem, RFID, NFC, GPS, radio, radar, GPIO link, and the like.

At step 814, the depository computer receives command(s) from the online server.

At step 815, it is determined whether the command(s) from the online server are to lock or unlock. In those instances where the command is not to unlock, the process proceeds to step 816, where the process terminates and awaits further commands from the remote data processing unit. For example, process 810 may terminate when the depository computer receives a command to keep the depository lock locked or the process times out after no commands are communicated or received.

In those instances where the depository computer receives a command to unlock the depository lock, the depository computer will communicate a signal to the operatively connected depository lock to unlock the depository lock as seen in step 817.

Operation Using More than One Token

Figure 2A:
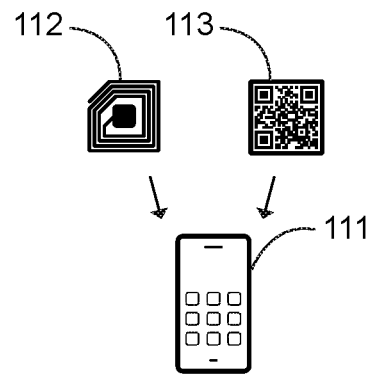
FIG. 2a shows a representation of one exemplary portable scanning device scanning more than one token, in accordance with some embodiments.
Figure 2B:
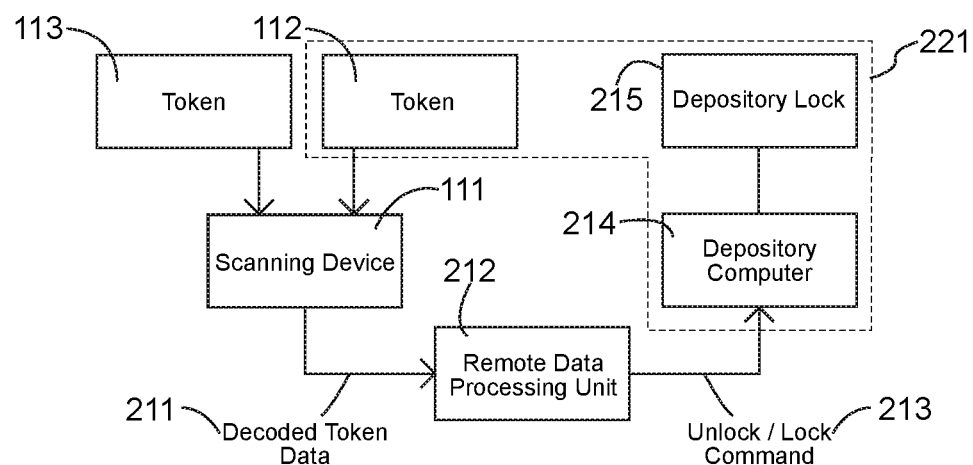
FIG. 2b depicts a simplified block diagram of the functioning of the present invention using more than one token, in accordance with some embodiments.

FIG. 2b depicts a simplified block diagram of the present invention using more than one token. More than one token may be scanned, however, at least one token identifying a depository system 221 and/or any component or group of components within that system should be among the tokens scanned. In this example, two tokens will be used to unlock depository lock. A token 112 identifies depository 221, which comprises a depository computer 214 and a depository lock 215. Token 112 will typically be found on or in close proximity to depository lock 215. A token 113 identifies an item to be deposited.

FIG. 2a shows a representation of one exemplary portable scanning device 111 and token 112 and token 113 positioned within close proximity. In this representation, scanning device 111 can be a smartphone.

Turning back to FIG. 2b, token 112 and token 113 are presented to scanning device 111. Accordingly, scanning device 111 scans and decodes token 112 and token 113, and communicates all the decoded token data 211 along with the scanning device's credentials to a remote data processing unit 212. If decoded token data 211 does not have the appropriate credentials or permission level to access the depository, the information will be communicated back to scanning device 111 notifying it of denied access. If decoded token data 211 along with the scanning device's credentials have the appropriate credentials or permission level to access depository system 221, a command 213 to unlock is communicated to depository computer 214 from remote data processing unit 212.

Depository computer 214 will lock or unlock depository lock 215 based on data from command 213.

Though FIG. 2a and FIG. 2b both show instances when two tokens are used, these drawings are not intended to be limiting in any way. For instance, if there is more than one parcel that needs to be deposited, requiring three or more tokens to be used, scanning device 111 can scan and decode the token on the second item after scanning token 112 and token 113. Any additional tokens can also be scanned in succession before all decoded token data and the scanning device's credentials are communicated to remote data processing unit 212.

In another example of this embodiment, if a consignor wants to send a parcel using the depository, a similar process of accessing the depository is used. The consignor can notify a courier that delivery is requested. The courier can then send the consignor a unique token identifying the parcel. The consignor will affix the token to the parcel. When the consignor wishes to deposit the parcel into the depository system, he or she will use their scanning device to scan the token associated with the depository system and/or any component or group of components within that system and the token on the parcel. The scanning device will then communicate the decoded token data along with the scanning device's credentials to the remote data processing unit. If the decoded token data does not have the appropriate credentials or permission level to access the depository, the information will be communicated back to the scanning device notifying it of denied access. If the decoded token data along with the scanning device's credentials have the appropriate credentials or permission level to access the depository system, a command to unlock is communicated to the depository computer from the remote data processing unit.

Once the depository is open, the consignor can deposit the parcel into the depository.

Upon successful deposit of the parcel, the courier will be notified to pick up the package.

If there is more than one parcel that needs to be deposited, the items can be scanned in succession before all decoded token data and the scanning device's credentials are communicated to the remote data processing unit.

Operation Using One Token

A similar process of steps may be used for the retrieval of a parcel from the depository, where the recipient will perform steps to unlock the depository lock to remove the parcel.

In this example, a user can be a consignee accessing the depository to retrieve a parcel. The consignee will use the scanning device to scan the token identifying the depository system and/or any component or group of components within that system. The scanning device will communicate decoded token information to the remote data processing unit or online database. The remote data processing unit will then determine whether the scanning device is authorized to access the depository. If access is granted, a command will be communicated to the lock to unlock.

Figure 1B:
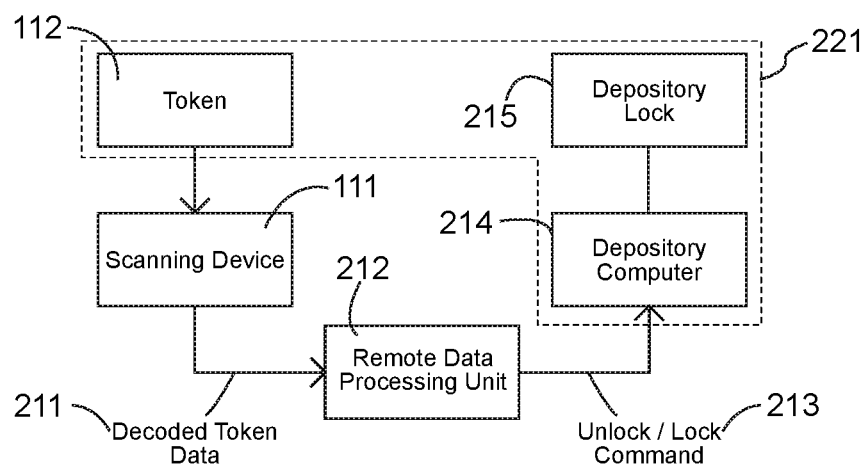
FIG. 1b depicts a simplified block diagram of the functioning of the present invention using one token, in accordance with some embodiments.

FIG. 1b depicts a simplified block diagram of an embodiment of the present invention using one token. The token identifies a depository system 221 and/or any component or group of components within that system. Token 112 identifies the depository system 221, which comprises depository computer 214 and depository lock 215. Token 112 will typically be found on or in close proximity to depository lock 215.

FIG. 1a shows a representation of one exemplary portable scanning device 111 and token 112 positioned within close proximity. In this representation, scanning device 111 can be a smartphone.

Turning back to FIG. 1b, token 112 is presented to scanning device 111. Scanning device 111 scans and decodes token 112, and communicates decoded token data 211 along with the scanning device's credentials to remote data processing unit 212. If decoded token data 211 does not have the appropriate credentials or permission level to access the depository, the information will be communicated back to scanning device 111 notifying it of denied access. If decoded token data 211 along with the scanning device's credentials have the appropriate credentials or permission level to access depository system 221, command 213 to unlock is communicated to depository computer 214 from remote data processing unit 212.

Depository computer 214 will lock or unlock depository lock 215 based on data from command 213.

Multiple Operations

Figure 9:
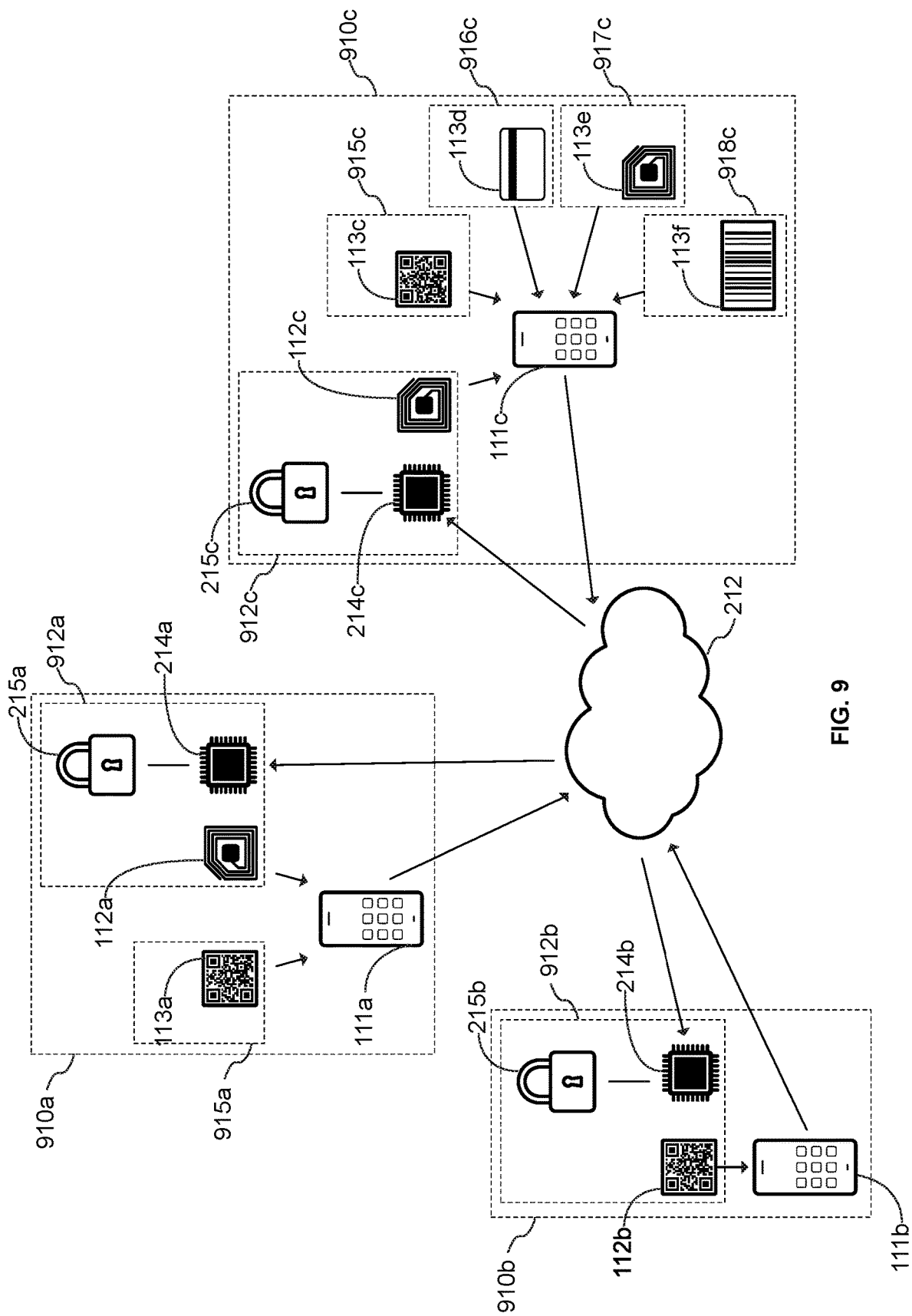
FIG. 9 shows a representation of multiple unique instances of scanning devices scanning one or more tokens to unlock a depository lock and utilizing a common remote data processing unit, in accordance with some embodiments.

FIG. 9 shows a representation of multiple unique instances of scanning devices 111a, 111b, and 111c scanning one or more tokens to unlock a depository lock utilizing a common remote data processing unit 212, in accordance with some embodiments. In this example, three simultaneous instances 910a, 910b, and 910c of remotely controlling locks on depositories are shown, yet, other implementations may have more or less simultaneous instances. Similar to scanning device 111 in FIG. 1B and FIG. 2B, scanning devices 111a, 111b, and 111c, each scan at least one token; and, similar to token 112 in FIG. 1B and FIG. 2B, at least one token, token 112a, token 112b, and token 112c, each identifying respective depository systems 912a, 912b, and 912c and/or any component or group of components within that system, should be among the tokens scanned.

It can also be assumed that each unique instance is undergoing a separate process of accessing the depository and can be operated simultaneously from different locations and users. For example, instance 910a may be a courier wishing to deposit a parcel 915a into depository system 912a. In this instance, scanning device 111a is used to scan token 113a, associated with the parcel 915a, and token 112a, associated with depository system 912a. Scanning device 111a will communicate data to remote data processing unit 212. If access is granted, remote data processing unit 212 will communicate a command to depository computer 214a to unlock depository lock 215a.

In instance 910b, a user may wish to access a depository system 912b. In this instance, scanning device 111b is used to scan token 112b, associated with depository system 912b. Like scanning device 111a, scanning device 111b will communicate data to remote data processing unit 212. If access is granted, remote data processing unit 212 will communicate a command to depository computer 214b to unlock depository lock 215b.

In instance 910c, a user may wish to deposit multiple items, including 915c, 916c, 917c, and 918c, into a depository system 912c. In this instance, scanning device 111c is used to scan token 113c, token 113d, token 113e, and token 113*f* associated with items 915*c*, 916*c*, 917*c*, and 918*c*, respectively, and token 112*c*, associated with depository system 912*c*. Like scanning device 111*a* and scanning device 111*b*, scanning device 111*c* will also communicate data to remote data processing unit 212. If access is granted, remote data processing unit 212 will communicate a command to depository computer 214*c* to unlock depository lock 215*c*.

Additionally, or alternatively, one or more remote data processing units may act as an intermediary between a scanning device and one or more of the tokens, capable of decoding machine-readable media. Similarly, in some embodiments, the remote data processing unit may provide the user interface to the scanning device and/or interact with an application operating on the scanning device to populate the user interface and/or receive commands through the user's interaction with the user interface.

Examples of Depository Systems

Figure 10:
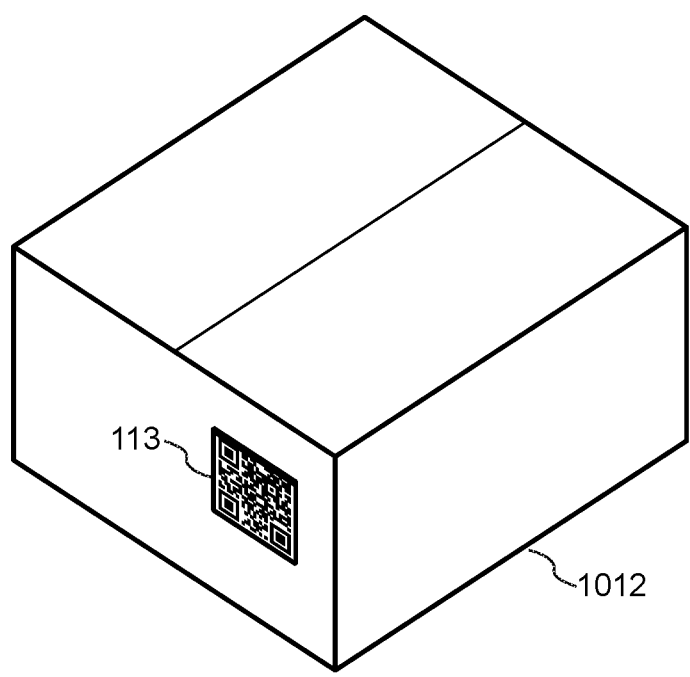
FIG. 10 shows a representation of a token positioned on or near the object it is associated with, in accordance with some embodiments.
Figure 11A:
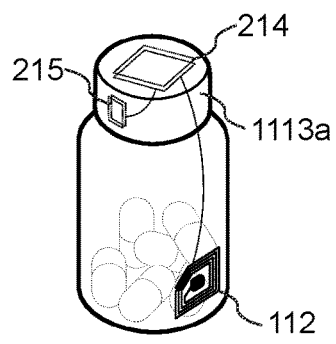
Figure 11B:
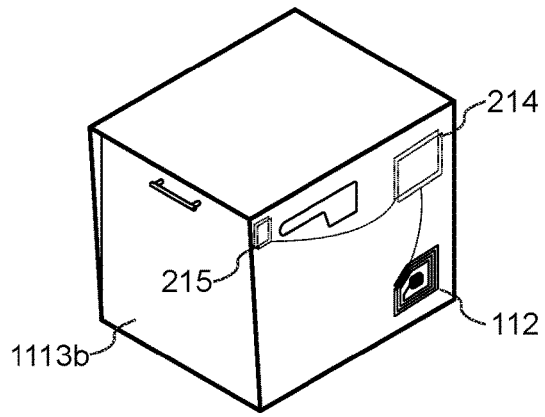
Figure 11C:
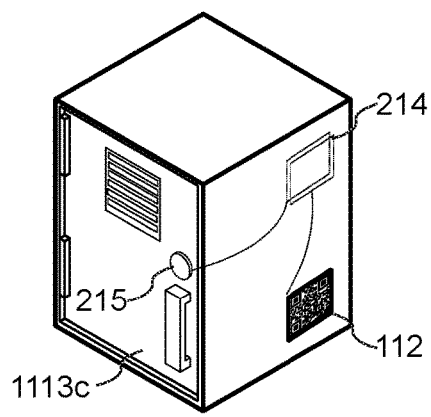
Figure 11D:
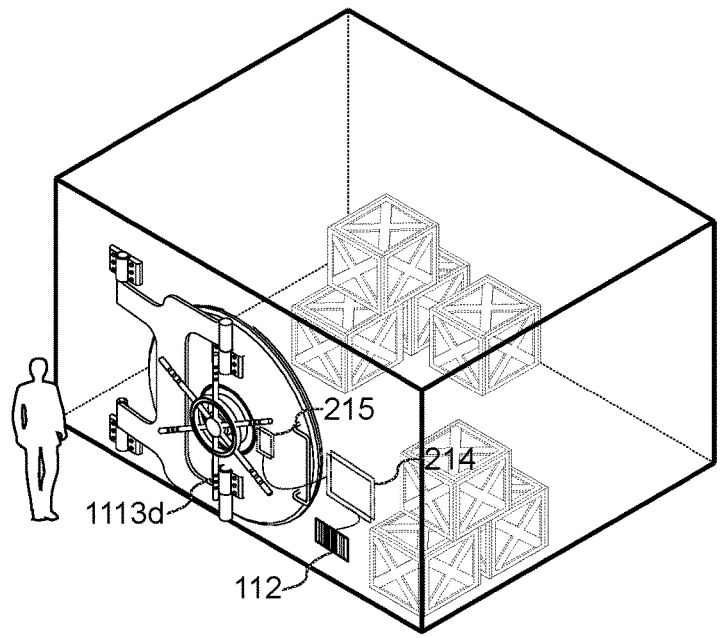

FIG. 10 shows a representation of a token positioned on or near the object it is associated with, in accordance with some embodiments. The term "token" shall be construed to mean any machine-readable medium that may be used to identify something assigned to it. Some things identified with tokens may include, but are not limited to: objects, parcels, depositories, bottles, vials, locks, safes, vaults, scanners, addresses, locations, phone numbers, email addresses, social media accounts, users, and recipients. Examples of machine-readable medium may include, but are not limited to: bar codes, QR codes, NFC chips, and RFID tags.

FIG. 11*a*, FIG. 11*b*, FIG. 11*c*, and FIG. 11*d* show examples of embodiments with tokens positioned on or near the depository locks they are associated with. The term "depository" or "depository system" shall be construed to mean any depository, container, receptacle, postbox, locker, cabinet, vault, safe, vial, and the like, as well as any or all of its associated elements. In some instances, a "depository" can also be construed to mean an intended destination, user, or recipient. Each depository is identified with at least one token.

For example, FIG. 11*a*, FIG. 11*b*, FIG. 11*c*, and FIG. 11*d* show different embodiments of system 510, where each system comprises a depository token 112, a depository computer 214, and a depository lock 215. FIG. 11*a*, FIG. 11*b*, FIG. 11*c*, and FIG. 11*d* are meant to serve as examples of depositories, and should not be construed to be limiting. A depository is defined by sidewalls that form a cavity sized and dimensioned to contain objects. The depository also comprises a cover, cap, lid, door, or the like, such as 1113*a*, 1113*b*, 1113*c*, and 1113*d*, that regulates access to the cavity and lock 215. Lock 215 regulates the locking and unlocking of the cover, cap, lid, or door. In some embodiments, depository computer 214 may contain components that allow wireless power transfer to power system 510. In some embodiments, a battery may be used with depository computer 214. Further, in other embodiments, other devices or electrical lines may be coupled to the depository system to power the system.

Additional Embodiments

Figures 12A, 12B:
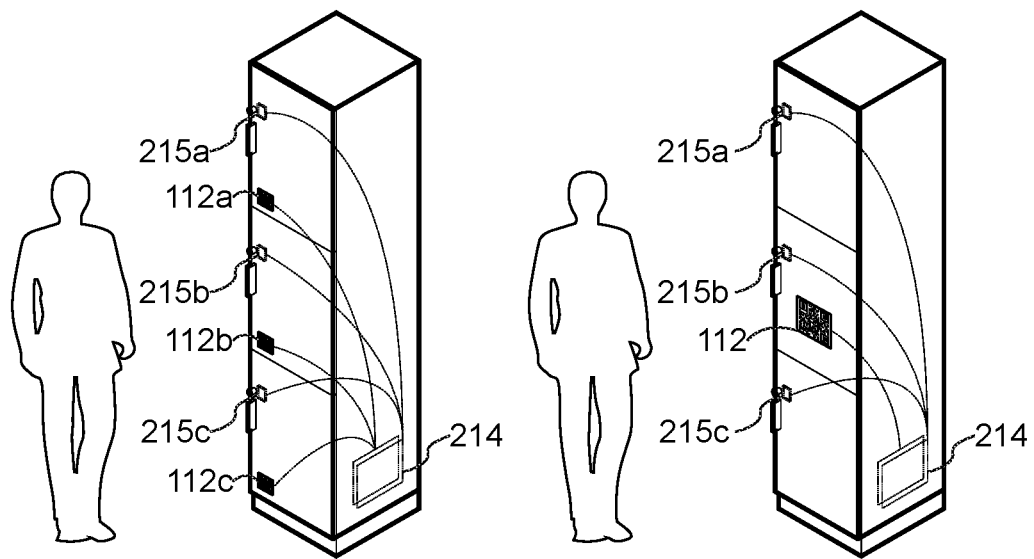
FIG. 12a shows a representation of a depository computer controlling more than one depository lock with its tokens positioned on or near its depository locks.
FIG. 12b shows a representation of a depository computer controlling more than one depository lock using one token positioned on or near the depository locks.

In some embodiments, multiple locks are used in a depository system. FIG. 12*a* shows another embodiment of system 510 where a depository computer 214 controls more than one depository lock with each of their respective tokens positioned on or near the lock. Token 112*a* is associated with depository lock 215*a*, token 112*b* is associated with depository lock 215*b*, and token 112*c* is associated with depository lock 215*c*. Depository lock 215*a*, depository lock 215*b*, and depository lock 215*c* are operatively connected to depository computer 214. The process of unlocking is the same. For example, if a user wishes to unlock lock 215*b*, the user will scan token 112*b* among all the tokens scanned. The scanning device will communicate all decoded token information to the remote data processing unit. If the decoded token data along with the scanning device's credentials have the appropriate credentials or permission level to access the depository system, a command is communicated to depository computer 214 to open depository lock 215*b*. In another example, if a user wishes to unlock more than one depository lock, say lock 215*a* and lock 215*c*, the user will scan token 112*a* and 112*c* among all the tokens scanned. Similarly, the scanning device will communicate all decoded token data to the remote data processing unit. If the decoded token data along with the scanning device's credentials have the appropriate credentials or permission level to access the depository system, a command is communicated to depository computer 214 to open depository lock 215*a* and depository lock 215*c*.

FIG. 12*b* shows another embodiment of system 510 where a depository computer 214 controls more than one depository lock using one token positioned on or near the locks. Token 112 is associated with depository lock 215*a*, depository lock 215*b*, and depository lock 215*c*. Depository lock 215*a*, depository lock 215*b*, and depository lock 215*c* are operatively connected to depository computer 214. In some embodiments, the user interface will request information for which depository lock the user of the scanning device wishes to access. After inputting a response, the process of unlocking will then be the same. For example, if a user wishes to unlock lock 215*b*, the user will scan token 112 among all the tokens scanned. The scanning device will communicate all decoded token information to the remote data processing unit. The remote data processing unit will determine which lock to unlock based on user information provided from the scanning device. If the decoded token data along with the scanning device's credentials have the appropriate credentials or permission level to access the depository system, a command is communicated to depository computer 214 to open depository lock 215*b*. In another example, if a user wishes to unlock more than one depository lock, say lock 215*a* and lock 215*c*, the user will scan token 112 among all the tokens scanned. In some embodiments, the user interface will request information for which depository lock the user of the scanning device wishes to access. After inputting a response, the process of unlocking will then be the same. The scanning device will communicate all decoded token data to the remote data processing unit. If the decoded token data along with the scanning device's credentials have the appropriate credentials or permission level to access the depository system, a command is communicated to depository computer 214 to open the depository lock 215*a* and depository lock 215*c*.

Alternative Embodiment

It is common for locked depositories to be "unsmart" and in remote locations with little to no access to electricity. For example, a postbox is typically located near the curb or sidewalk of a property. Due to its location, a power source is difficult to obtain. An on-board battery can only last a few days before needing to be recharged or replaced. Solar panels are costly and do not offer reliable power during cloudy or foul weather conditions. Wireless power transfer is useful to power electrical devices where interconnecting wires are inconvenient, hazardous, or are not possible.

According to various embodiments of this disclosure, it can be beneficial in many instances to allow scanning devices to wirelessly transmit and/or share power to tokens, depository systems, microprocessors and associated elements, such as microprocessors, transceivers, memory, locks, sensors, and the like. For example, some embodiments allow one token and associated depository components to obtain power from and/or use battery power from a scanning device. In some implementations, an antenna system allows one or more of the following: scanning device, depository systems, servers, and tokens to operate without any externally accessible communications ports and/or power cords. Instead, power and communications are received and/or transmitted wirelessly. For example, referring to FIG. 1b and FIG. 2b, depository system 221 may receive power for its operations from scanning device 111. Furthermore, by way of example, if token 112 is an RFID tag, the scanning device will deliver power to RFID to extract token information, while simultaneously delivering the needed power to operate depository computer 214 and depository lock 215. Whereas if the token does not require power, it should mean the power is delivered to operate other parts of the system. As such, in some implementations, the depository system can be designed and assembled without any external ports or connectors, and one or more antenna systems can be incorporated that allow the depository system to acquire power and perform its functions.

CONCLUSIONS, RAMIFICATIONS, AND SCOPE

Thus, at least one embodiment of the invention provides a system and method for remotely controlling locks on depositories. While the above description contains many specificities, they should not be construed as limitations on the scope, but rather as an exemplification of one or several embodiments thereof. Many other variations are possible.

It should be noted that while examples of the present invention have been given in relation to locks for depositories, such as mailboxes, lockers, safes, and vaults, any lock can be controlled using the present invention regardless of the size or shape of the depository or its contents.

In all of the embodiments, whether or not a user or scanning device is authorized to open a lock depends on data provided to the remote data processing unit or online database. Scanner identification data, token data, and time data are communicated to the remote data processing unity for verification along with other information, such as parcel tracking numbers of expected deliveries. Data can be communicated from a computer or other remote source over a wired or wireless network. It should also be noted that any part of the system might be remote and communication between parts of the system can take place over a network such as the Internet or a private network. Remote communication can be encrypted for further security.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined not by the embodiments illustrated, but by the appended claims and their legal equivalence.

What is claimed is:

1. A method for remotely controlling locks on depositories, the method comprising:
providing a depository system comprising sidewalls that form one or more cavities that are sized and dimensioned to contain objects, a cover or door, a depository computer, and at least one depository lock that regulates access to said one or more cavities;
providing a scanning device capable of going online and communicating, decoding, and/or receiving data from any machine-readable medium;
providing a first identification token, a second identification token, and at least a third identification token, the first identification token identifying a depository system and/or any cavities in the depository system, the second identification token identifying a unique parcel or object for storage in a cavity associated with the first identification token, and the at least third identification token identifying the scanning device and/or user;
receiving, through the user interface of the scanning device, user instructions;
scanning and decoding the first identification token;
processing and communicating information identifying the third identification token to a remote data processing unit;
processing and communicating decoded token data from the first identification token to the remote data processing unit;
verifying credentials associated with the first identification token with said remote data processing unit, and communicating instructions to the depository computer; and
communicating a command from said depository computer to the depository lock to open the depository lock;
scanning and/or decoding the second identification token and the third identification token;
processing and communicating decoded token data from the second identification token to the remote data processing unit;
verifying credentials associated with the second identification token with said remote data processing unit and communicating verification to a third party associated with the unique parcel or object;
wherein said method provides a verified and recorded user to remotely access a locked depository.

2. The method of claim 1 further comprising the step of transferring power from the scanning device to the depository system.

3. The method of claim 1 further comprising the step of the depository system connecting online and accessing the remote data processing unit once it is powered on.

4. The method of claim 1 further comprising the step of data being encrypted prior to being communicated from the scanning device to the remote data processing unit and being decrypted after the data has been transferred.

5. The method of claim 1 further comprising the step of data being encrypted prior to being communicated from the remote data processing unit to the depository computer and being decrypted after the data has been transferred.

6. The method of claim 1 further comprising the step of keeping a record of when each token is used and who used it on the online database to record attempts to access the depository as well as confirm access and/or delivery.

7. The method of claim 1 further comprising the step of retrieving an object from a cavity of the depository system, closing the door, and ensuring the lock is relocked.

8. The method of claim 1 further comprising the step of depositing an object into a cavity of the depository system, closing the door, and ensuring the lock is relocked.

9. The method of claim 1 further comprising the step of waiting a predetermined amount of time before the lock is relocked after being unlocked.

10. The method for remotely controlling locks on depositories of claim 1, wherein the unique parcel or object is specifically designated for storage in the cavity associated with the first token.

11. The method for remotely controlling locks on depositories of claim 1, wherein the unique parcel or object stored in a cavity associated with the first identification token.

12. The method for remotely controlling locks on depositories of claim 1, wherein the remote data processing unit verifies credentials associated with more than one token.

13. The method for remotely controlling locks on depositories of claim 1, wherein the scanning device processes and communicates information identifying the scanning device, user, user instructions, and/or other tokens to the remote data processing unit.

14. A system for remotely controlling locks on depositories, said system comprising:
- a depository system comprising sidewalls that form one or more cavities that are sized and dimensioned to contain objects, a cover or door, a depository computer, and at least one depository lock that regulates access to said one or more cavities;
- a scanning device, for going online and communicating, decoding, and/or receiving data from any machine-readable medium;
- a first identification token, a second identification token, and at least a third identification token, the first identification token containing identification information about the depository system and/or any component or group of components within said depository-system, the second identification token identifying a unique parcel or object for storage in a cavity among the one or more cavities of the depository system, and the third identification token identifying the scanning device and/or user; and
- a remote data processing unit;
- wherein said scanning device is operatively connected to the remote data processing unit; said remote data processing unit is operatively connected to the depository computer; said depository computer is operatively connected to the depository lock so that the scanning and/or decoding of the first token with the scanning device identifies the component of the depository system and the scanning and/or decoding of the at least a second token identifies the unique parcel or object for storage in the cavity of the depository system, and the remote data processing unit is further configured to verify credentials associated with the at least second identification token and communicate verification of the credentials to a third party associated with the unique parcel or object.

15. The system for remotely controlling locks on depositories of claim 14, wherein said lock is electronically or remotely controlled to lock or unlock.

16. The system for remotely controlling locks on depositories of claim 14, wherein said scanning device accepts input through a user interface.

17. The system for remotely controlling locks on depositories of claim 14, wherein said first token and at least a second token comprise machine-readable media.

18. The system for remotely controlling locks on depositories of claim 14, further comprising a power source, wherein a mobile device or battery transfers power to the depository system.

19. The system for remotely controlling locks on depositories of claim 14, further comprising more than one way to power the depository system.

\* \* \* \* \*